(12) United States Patent
Kim et al.

(10) Patent No.: US 6,470,864 B2
(45) Date of Patent: Oct. 29, 2002

(54) TURBOCHARGED ENGINE WITH EXHAUST GAS RECIRCULATION

(75) Inventors: Charlie C. Kim, Martinsburg, WV (US); Robert Gorman, Chambersburg, PA (US)

(73) Assignee: Mack Trucks, Inc., Allentown, PA (US)

(*) Notice: Subject to any disclaimer, the term of this patent is extended or adjusted under 35 U.S.C. 154(b) by 21 days.

(21) Appl. No.: 09/817,265

(22) Filed: Mar. 27, 2001

(65) Prior Publication Data

US 2001/0035171 A1 Nov. 1, 2001

Related U.S. Application Data (60) Provisional application No. 60/192,323, filed on Mar. 27, 2000.

(51) Int. Cl.[7] ............................ F02M 25/07; F02B 33/44
(52) U.S. Cl. ................................ 123/568.12; 60/605.2; 60/602; 60/606
(58) Field of Search ................. 123/568.11, 568.12; 60/602, 605.2, 600, 606, 611

(56) References Cited

U.S. PATENT DOCUMENTS

| | | | |
|---|---|---|---|
| 3,925,989 A | 12/1975 | Pustelnik | |
| 3,996,748 A | * 12/1976 | Melchior | 60/605.2 |
| 4,142,493 A | 3/1979 | Schira et al. | |
| 4,164,032 A | 8/1979 | Nohira et al. | |
| 4,164,206 A | 8/1979 | Toelle | |
| 4,215,550 A | 8/1980 | Dinger et al. | |
| 4,426,848 A | * 1/1984 | Stachowicz | 60/605.2 |
| 4,440,140 A | 4/1984 | Kawagoe et al. | |
| 4,446,840 A | 5/1984 | Nakagawa et al. | |
| 4,450,824 A | 5/1984 | Ando et al. | |
| 4,452,217 A | 6/1984 | Kawamura et al. | |
| 4,594,993 A | 6/1986 | Engel et al. | |
| 4,625,702 A | 12/1986 | Onishi | |
| 5,363,091 A | 11/1994 | Kotwicki et al. | |
| 5,440,880 A | 8/1995 | Ceynow et al. | |
| 5,625,750 A | 4/1997 | Puskorius et al. | |
| 5,703,777 A | 12/1997 | Buchhop et al. | |
| 5,758,309 A | 5/1998 | Satoh | |
| 5,771,867 A | 6/1998 | Amstutz et al. | |
| 5,802,846 A | * 9/1998 | Bailey | 60/605.2 |
| 5,890,359 A | 4/1999 | Enander | |
| 5,921,223 A | 7/1999 | Fukuma | |
| 5,924,280 A | 7/1999 | Tarabulski | |
| 6,038,860 A | * 3/2000 | Bailey | 60/605.2 |
| 6,276,139 B1 | * 8/2001 | Moraal et al. | 60/605.2 |
| 6,324,846 B1 | * 12/2001 | Clarke | 60/605.2 |

FOREIGN PATENT DOCUMENTS

| | | |
|---|---|---|
| DE | 3807372 A1 | 9/1989 |
| WO | WO 95/12335 A1 | 7/1992 |
| WO | WO 96/18031 A1 | 6/1996 |
| WO | WO 99/31373 A1 | 6/1999 |

* cited by examiner

*Primary Examiner*—Willis R. Wolfe
(74) *Attorney, Agent, or Firm*—Rothwell, Figg, Ernst & Manbeck (57) ABSTRACT

A turbocharged internal combustion engine assembly with exhaust gas recirculation (EGR) includes an air compressor driven by an exhaust turbine, an EGR line that diverts exhaust gases from an exhaust line leading from the engine to an air intake line leading to the engine from the compressor, and a combustion bypass line that conveys compressed air from the compressor to the exhaust turbine without combustion. A pressure adjusting feature disposed along at least one of the air intake line and the exhaust line maintains the pressure at the turbine inlet below the pressure at the compressor outlet and above the pressure at the air inlet of the engine. Examples of suitable pressure adjusting features include a venturi placed in the air intake line at the second point, a power turbine located along the exhaust line downstream of the exhaust turbine, a split exhaust manifold feeding unequal turbine inlets, and an orifice located along the exhaust line between the EGR line and the bypass line.

18 Claims, 5 Drawing Sheets

TURBOCHARGED ENGINE WITH EXHAUST GAS RECIRCULATION

CROSS REFERENCE TO RELATED APPLICATIONS

This application claims the benefit of provisional application Ser. No. 60/192,323 filed Mar. 27, 2000.

BACKGROUND OF THE INVENTION

1. Field of the Invention

The present invention relates generally to the field of internal combustion engines and, more particularly, to turbocharged internal combustion engines with exhaust gas recirculation (EGR).

2. Description of the Background Art

Turbocharging is a well known method for increasing power output from an internal combustion engine. In a typical turbocharged engine, a turbine uses energy from exhaust gases to power a compressor. This increases the pressure of the air supplied to the engine so that higher cylinder pressure can be achieved thereby improving the performance of the engine.

While improvements in engine performance are desirable, it is also important for an engine to comply with existing emissions requirements. One way in which emissions are reduced to acceptable levels is through the use of exhaust gas recirculation (EGR) wherein a conduit connects the exhaust manifold to the intake manifold to allow exhaust gas to be recycled through the engine. In this manner, exhaust species which are still rich in nitrogen are reintroduced to the engine, lowering $NO_x$ emissions levels by lowering flame temperature.

In view of the desire for improved performance and the need for reduced emissions, it is not surprising that turbocharged internal combustion engines with EGR are known in the art. In one engine of this type, exemplified by U.S. Pat. No. 3,925,989 to Pustelnik, a compressor is driven by a turbine connected to the exhaust manifold to pressurize intake air for the engine, and an EGR manifold is connected between the exhaust manifold and the intake manifold to recycle exhaust gases back to the engine to reduce emissions. The EGR manifold includes a one-way valve or a series of valve arrangements to prevent the pressurized intake manifold air from backflowing into the exhaust manifold, and an EGR control system monitors the differential pressure between the intake and exhaust manifolds. When a predetermined pressure differential is established between the intake and exhaust manifolds, the EGR manifold valve opens to recycle exhaust gases.

A disadvantage of turbocharged internal combustion engines with EGR of the above type is that diversion of exhaust gases through the EGR manifold tends to reduce air flow through the compressor. Since compressor map width (i.e., the range of mass air flow over which the compressor is fully functional) decreases with increasing compressor pressure ratio for a given engine speed, any reduction in air flow through the compressor will tend to result in a reduction in surge margin thereby increasing the likelihood of compressor malfunction when there are changes in the air inlet temperature and/or the amount of air flowing through the compressor especially at low engine speeds. Compressor choke problems can also occur at rated load and speed.

In a variation of the above system, exemplified by U.S. Pat. No. 4,215,550 to Dinger et al., a bypass line extends from the intake manifold to a combustion chamber from which it separates into two branches that connect with the exhaust manifold and the EGR manifold, respectively, so that intensely preheated gas from the combustion chamber can be mixed with recycled exhaust gases to overcome unfavorable ignition conditions. While this approach may improve the ability of an engine to start under extreme conditions, the addition of a combustion chamber increases the cost and complexity of the system and may also reduce efficiency and surge margin by significantly increasing pressure ratios.

Thus, there remains a need in the art for improvements in turbocharged internal combustion engines with EGR.

SUMMARY OF THE INVENTION

The above-mentioned disadvantages of the prior art are overcome with the present invention, one aspect of which is generally characterized in a turbocharged internal combustion engine assembly with exhaust gas recirculation (EGR) including an air compressor driven by an exhaust turbine, an air intake line for conveying air from the compressor to the engine, an exhaust line for conveying exhaust gas from the engine to the exhaust turbine, an EGR line extending from a first point on the exhaust line downstream of the engine to a second point on the air intake line upstream of the engine, a combustion bypass line extending from a third point on the air intake line upstream of the exhaust gas recirculation line to a fourth point on the exhaust line downstream of the exhaust gas recirculation line, and a pressure adjusting feature disposed along at least one of the air intake line and the exhaust line to maintain the pressure at the fourth point below the pressure at the third point and above the pressure at the second point. Examples of suitable pressure adjusting features include a venturi placed in the air intake line at the second point, a power turbine located along the exhaust line downstream of the exhaust turbine, a split exhaust manifold feeding unequal turbine inlets, and an orifice located along the exhaust line between the EGR line and the bypass line.

Another aspect of the present invention is generally characterized in a method of operating a turbocharged engine assembly with exhaust gas recirculation including the steps of feeding exhaust gas from the engine to an exhaust turbine via an exhaust line, compressing air with an air compressor powered by the exhaust turbine, feeding compressed air from the air compressor to the-engine via-an air intake line, providing an exhaust gas recirculation line between a first point on the exhaust line downstream of the engine and a second point on the air intake line upstream of the engine, providing a combustion bypass line between a third point on the air intake line upstream of the second point and a fourth point on the exhaust line downstream of the first point, and adjusting the pressure in at least one of the air intake line and the exhaust line such that the pressure at the fourth point is below the pressure at the third point and above the pressure at the second point so that a first portion of the exhaust gas from the engine is mixed with a first portion of the compressed air from the compressor for combustion in the engine and a second portion of the compressed air is diverted from the air intake line to the exhaust line without being combusted. In one embodiment, the pressure adjusting step includes the step of passing the first compressed air portion through a venturi so that the second exhaust gas portion is mixed with the first compressed air portion in the venturi. In another embodiment, the pressure adjusting step includes the step of driving a power turbine with exhaust gases from the exhaust turbine via an extension of the exhaust line and connecting the combustion bypass line with the exhaust line extension. In yet another embodiment, the pressure adjusting step includes the steps of feeding exhaust gases from a first set of cylinders to a first turbine inlet and feeding exhaust gases from a second set of cylinders to a second turbine inlet. In still another embodiment, the pressure adjusting step includes the step of passing exhaust gases from the engine through an orifice in the exhaust line such that the pressure downstream of the orifice is lower than the pressure upstream of the orifice.

Some of the advantages of the present invention over the prior art include the ability to operate a turbocharged engine with EGR at lower engine speeds without surge problems and at rated load and speed without compressor choke problems, improvement in air to fuel ratio, simplified construction, and increased power output.

The above and other features and advantages of the present invention will be further understood from the following description of the preferred embodiments thereof, taken in conjunction with the accompanying drawings wherein like reference numerals are used throughout the various views to designate like parts.

DETAILED DESCRIPTION OF THE PREFERRED EMBODIMENTS

Figure 1:
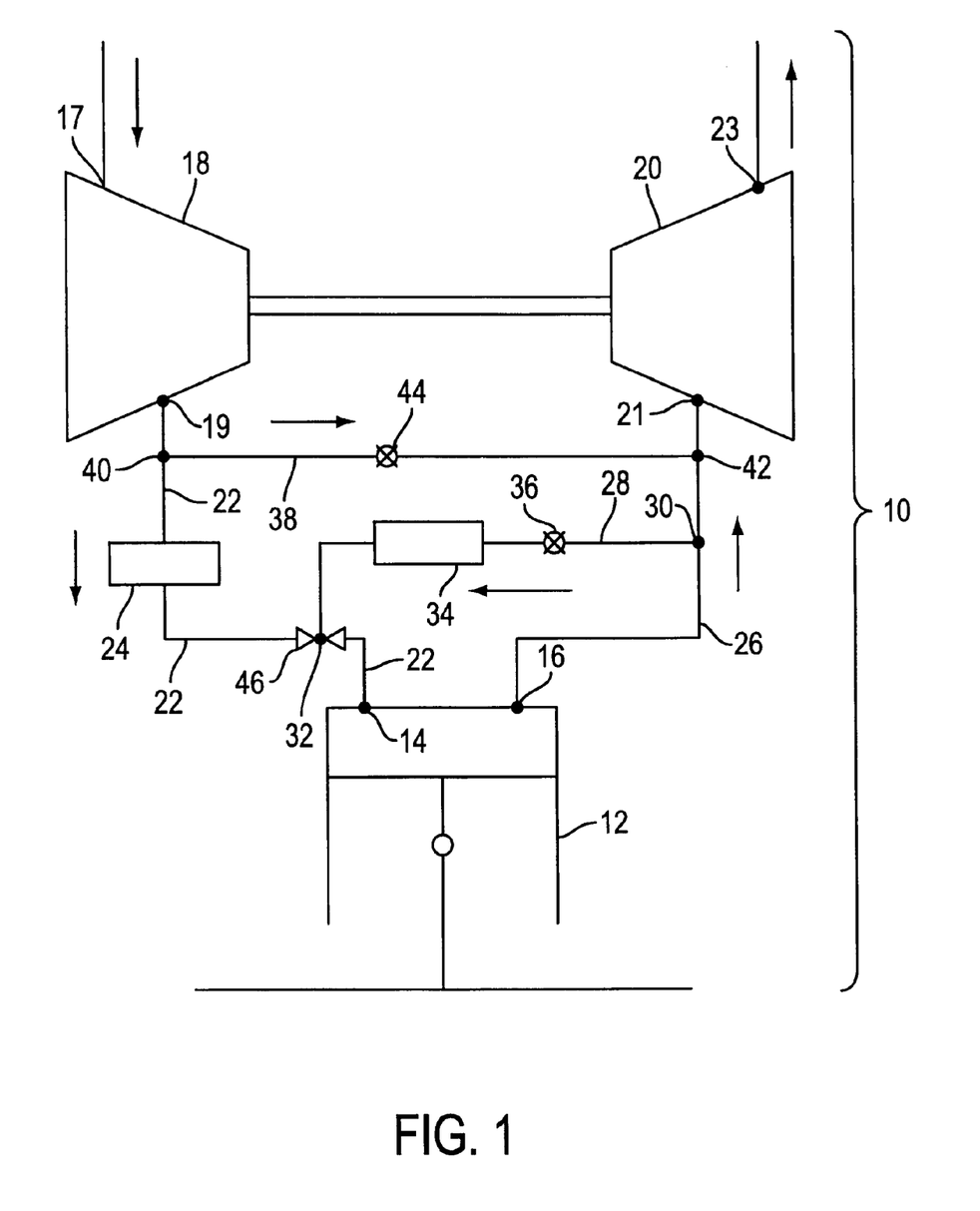
FIG. 1 is a schematic diagram showing a first embodiment of a turbocharged engine assembly with exhaust gas recirculation according to the present invention.

A first embodiment of a turbocharged internal combustion engine assembly 10 with exhaust gas recirculation (EGR) according to the present invention is shown in FIG. 1. The engine assembly 10 includes an internal combustion engine 12 with at least one cylinder in communication with an air inlet 14 and an exhaust gas outlet 16, and a turbocharger having an air compressor 18 driven by an exhaust turbine 20. The compressor includes an air inlet 17 and a compressed air outlet 19. The exhaust turbine includes a gas inlet 21 and a gas outlet 23. An air intake line 22 leads from the compressor outlet to the engine inlet via a first cooler 24, and an exhaust line 26 leads from the engine outlet to the exhaust turbine inlet. An EGR line 28 for recycling exhaust gases branches off from a first point 30 on the exhaust line to connect with the air intake line at a second point 32 via a second cooler 34. A valve 36 is provided along the EGR line upstream of the second cooler to control the amount of exhaust gas that is recycled through the engine. The components, as thus far described, are conventional and well-known in the art. Accordingly, no attempt is made herein to provide a detailed description of these components. Details of such components are available in numerous publications and patents including, by way of example, U.S. Pat. Nos. 3,925,989 to Pustelnik and 4,215,550 to Dinger et al.

In accordance with the present invention, a combustion bypass line 38 is connected between the compressor outlet 19 and the turbine inlet 21, and the turbine inlet geometry is chosen such that the pressure at the inlet is lower than the pressure at the compressor outlet so that compressed air can be made to flow from the compressor directly to the turbine without combustion. More specifically, the bypass line 38 extends from a third point 40 on the intake line 22 upstream from the second point 32 to a fourth point 42 on the exhaust line 26 downstream of the first point 30. A valve 44 is provided along the combustion bypass line 38 to control the amount of compressed air flowing from the compressor 18 to the turbine 20. In addition, a venturi 46 is disposed along the air intake line 22 downstream of the cooler 24 and the EGR line 28 is connected with the air intake line at the venturi.

In operation, an engine control unit (not shown) preferably monitors one or more operating parameters of the engine (e.g., air flow, compressor pressure ratio, engine speed, etc.) and controls the valves 36 and 44 based on certain predetermined conditions. The engine control unit preferably includes a microprocessor configured to receive signals from sensors measuring engine operating parameters, to determine whether certain predetermined conditions exist using the measured parameters, and to output signals that control the valves in an appropriate manner. Alternatively, various electrical, mechanical and electromechanical control mechanisms can be used to control the valves in response to predetermined conditions.

The engine 10 is preferably started with the bypass valve 44 and the EGR valve 36 closed; although, in a less preferred embodiment, one or both of these valves can be left open when starting the engine. Air initially drawn into the engine 10 when starting the engine will flow through the compressor 18 into the air intake line 22 without being charged (i.e., compressed). The air intake line 22 conveys the air into the engine (i.e., cylinder 12) where the air is then mixed with fuel and combusted to move a piston disposed within the cylinder. The resulting exhaust gases are expelled from the engine into the exhaust line 26 which conveys the exhaust gases to the turbine 20. The exhaust gases act on vanes within the turbine 20 to induce the turbine shaft to rotate. Rotation of the turbine shaft by the exhaust gases drives the compressor 18 so that air subsequently flowing through the compressor can be compressed before it enters the air intake line 22.

When engine loads increase to the point where operating conditions are such that NOx emissions may exceed specified levels, the EGR valve 36 is preferably opened to recycle a portion of the exhaust gases back through the engine. More specifically, a portion of the exhaust gas discharged from the engine is diverted from the first point 30 along the exhaust line 26 and conveyed through the EGR cooler 34 to the second point 32 on the intake line 22. The recycled exhaust gas then mixes with compressed air in the intake line 22 and is fed to the engine for combustion. In this manner, exhaust species which are still rich in nitrogen are reintroduced to the engine, lowering $NO_x$ emissions levels by lowering flame temperature.

Recirculation of exhaust gases in the above manner can reduce air flow through the compressor such that surge margin becomes a concern. This is particularly true when operating at relatively high compressor pressure ratios (e.g., greater than about 3.5:1) and lower engine speeds. When conditions are such that surge margin is deemed not to be adequate, air flow through the compressor can be increased by opening the bypass valve 44. For example, the engine control unit can be configured to open the bypass valve 44 when the surge margin is less than or equal to about 10% of the compressor map width.

As mentioned above, the turbine inlet geometry is chosen such that, when the bypass valve 44 is open, the pressure at the turbine inlet 21 will be lower than the pressure at the compressor outlet 19 so that a portion of the compressed air from the compressor 18 will flow directly into the exhaust turbine 20 from the compressor via the bypass line 38. This increases air flow through the compressor 18 thereby increasing surge margin to an acceptable level, even at low engine speeds. Opening the bypass valve 44 can also cause the pressure at the turbine inlet 21 to decrease; however, the compressed air that is not diverted through the bypass line 38 is subsequently cooled and passed through the venturi 46 where it is accelerated to reduce the pressure in the intake line 22 below the turbine inlet pressure so that exhaust gases continue to be diverted from the exhaust line 26 into the EGR line 28. The diverted exhaust gas passes through the EGR cooler 34 and into the intake manifold via the venturi 46, to mix with incoming air for combustion in the engine. Emissions from the engine are thus reduced without the significant reductions in air flow normally seen in turbocharged engines with EGR. This ensures sufficient surge margin to permit operation over a range of inlet air temperatures and to accommodate periodic changes in air flow.

Figure 2:
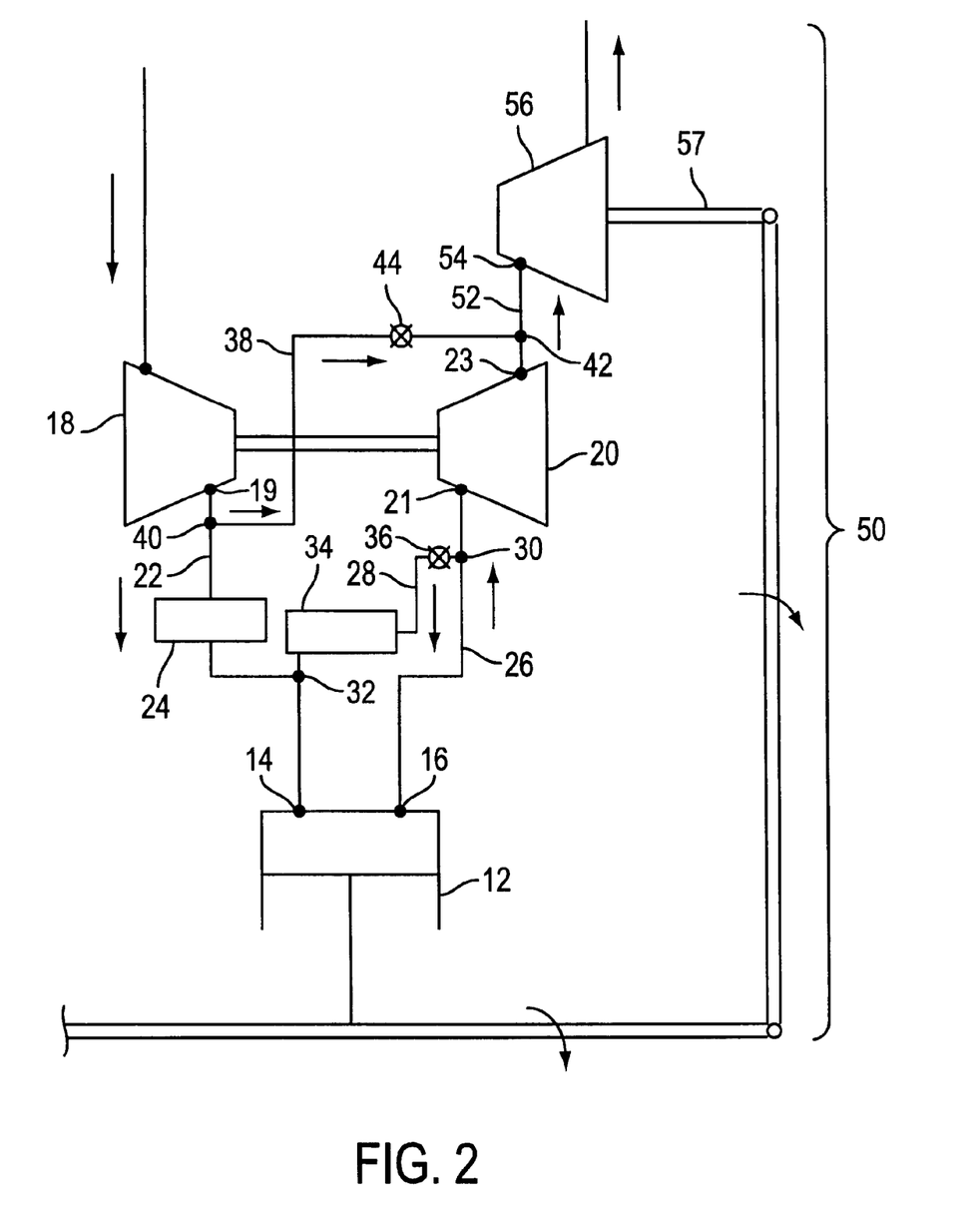
FIG. 2 is a schematic diagram showing a second embodiment of a turbocharged engine assembly with exhaust gas recirculation according to the present invention.

A second embodiment of a turbocharged internal combustion engine assembly with EGR according to the present invention is shown in FIG. 2 at 50. Like the embodiment shown in FIG. 1, the engine assembly in this second embodiment includes an engine 12 with at least one cylinder, and a turbocharger having an air compressor 18 driven by an exhaust turbine 20. The engine assembly also includes an air intake line 22 with a main cooler 24 that leads from the compressor outlet 19 to the engine inlet 14, an exhaust line 26 that leads from the engine outlet 16 to the exhaust turbine inlet 21, and a return line 28 with an EGR cooler 34 branching off from a first point 30 along the exhaust line and connecting with the air intake line at a point 32 upstream of the engine. Unlike the embodiment of FIG. 1, however, the engine assembly in this second embodiment does not include a venturi and the combustion bypass line 38 extends directly from a point 40 along the air intake line 22 to a point 42 along an extension 52 of the exhaust line extending from the exhaust turbine outlet 23 to the inlet 54 of a power turbine 56. The power turbine 56 includes a shaft 57 that can optionally be coupled with the drive shaft of the engine to provide additional power to the engine. A valve 44 in the combustion bypass line 38 controls the amount of compressed air allowed to flow through a the bypass line.

By eliminating the venturi and attaching a power turbine 56 to the turbine outlet 23 of the turbocharger, pressure in the exhaust line 26 at the turbine inlet 21 will be greater than pressure in the air intake line 22 downstream of the cooler 24 so that exhaust gases will tend to flow through the EGR line 28 when the EGR valve 36 is open. In addition, expansion of the exhaust gases in the exhaust turbine 20 will result in a lowering of the pressure at the turbine outlet 23 such that the pressure in the turbine exhaust line 52 is lower than the pressure in the air intake line 22 thereby promoting the flow of compressed air from the compressor 18 to the turbine exhaust line when the combustion bypass valve 44 is open. This increases air flow through the compressor as in the previous embodiment thereby increasing efficiency and surge margin.

Figure 3:
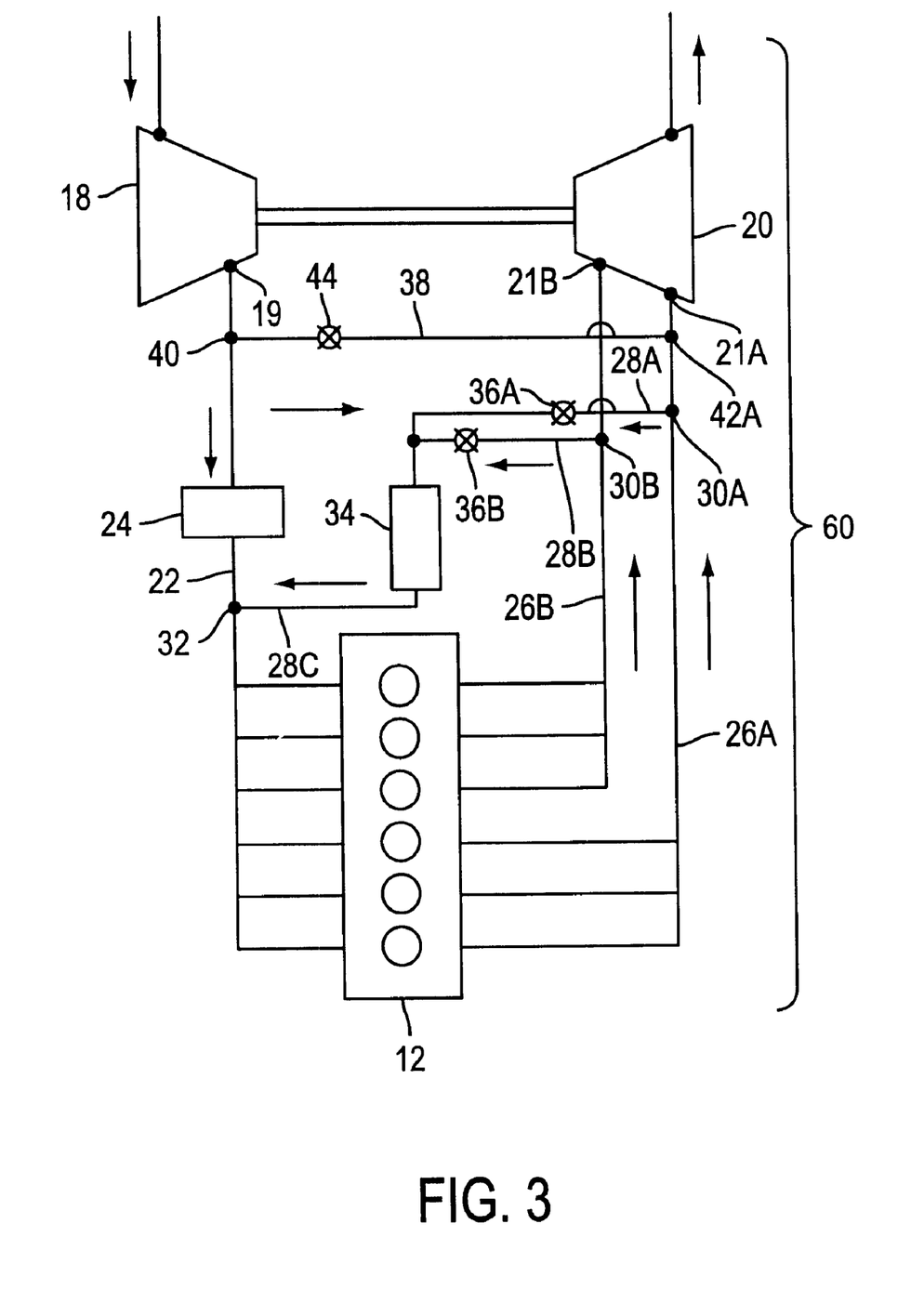
FIG. 3 is a schematic diagram showing a third embodiment of a turbocharged engine assembly with exhaust gas recirculation according to the present invention.

A third embodiment of a turbocharged internal combustion engine assembly with EGR according to the present invention is shown in FIG. 3 at 60. The engine assembly in this third embodiment includes an engine 12 with a plurality of cylinders, and a turbocharger having an air compressor 18 driven by an exhaust turbine 20. The engine assembly also includes an air inlet line 22 with a main cooler 24 that leads from the compressor 18 to the engine. Unlike the previous embodiments, however, a plurality of exhaust lines lead from the engine to the turbine and a corresponding number of EGR return lines lead from the respective exhaust lines to the air inlet line via an EGR cooler. More specifically, a first exhaust line 26A leads from a first set of cylinders 12A to a first, high pressure inlet 21A of the turbine and a second exhaust line 26B leads from a second set of cylinders 12B to a second, low pressure inlet 21B of the turbine. The combustion bypass line 38 extends directly from the third point 40 along the air inlet line 22 to a fourth point 42A along the first exhaust line 26A. The EGR return lines 28A and 28B extend from points 30A and 30B along respective exhaust lines 26A and 26B to a common EGR cooler 34 and continue as a single return line 28C from the cooler to the second point 32 along the air intake line 22. Valves 36A and 36B control the flow of exhaust gases through the exhaust lines 26A and 26B, respectively.

Due to the smaller turbine inlet area of the first turbine inlet nozzle 21A, pressure in the first exhaust line 26A will be higher than pressure in the second exhaust line 26B; however, the geometry of the first turbine inlet nozzle is chosen such that the pressure in the first exhaust line is lower than the pressure at the compressor outlet 19 so that compressed air will flow through the combustion bypass line 38 to the exhaust turbine 20 when the combustion bypass valve 44 is open. In addition, the geometry of the second turbine inlet nozzle 21B is chosen such that the pressure in the second exhaust line 26B at point 30B is higher than the pressure in the air intake line 22 at point 32 so that exhaust gases will flow through the second EGR line 28B when the second EGR valve 36B is open. When conditions are such that it is desirable to recycle exhaust gases, the second EGR valve 36B is opened in the second EGR line 28B. Then, the combustion bypass valve 44 can be opened. Since the pressure in the first exhaust line 2GA is already higher than in the second exhaust line 26B, exhaust gases will flow through the first EGR line 28A when the EGR valve 36A is opened causing a greater portion of the exhaust gases to be recycled.

Figure 4:
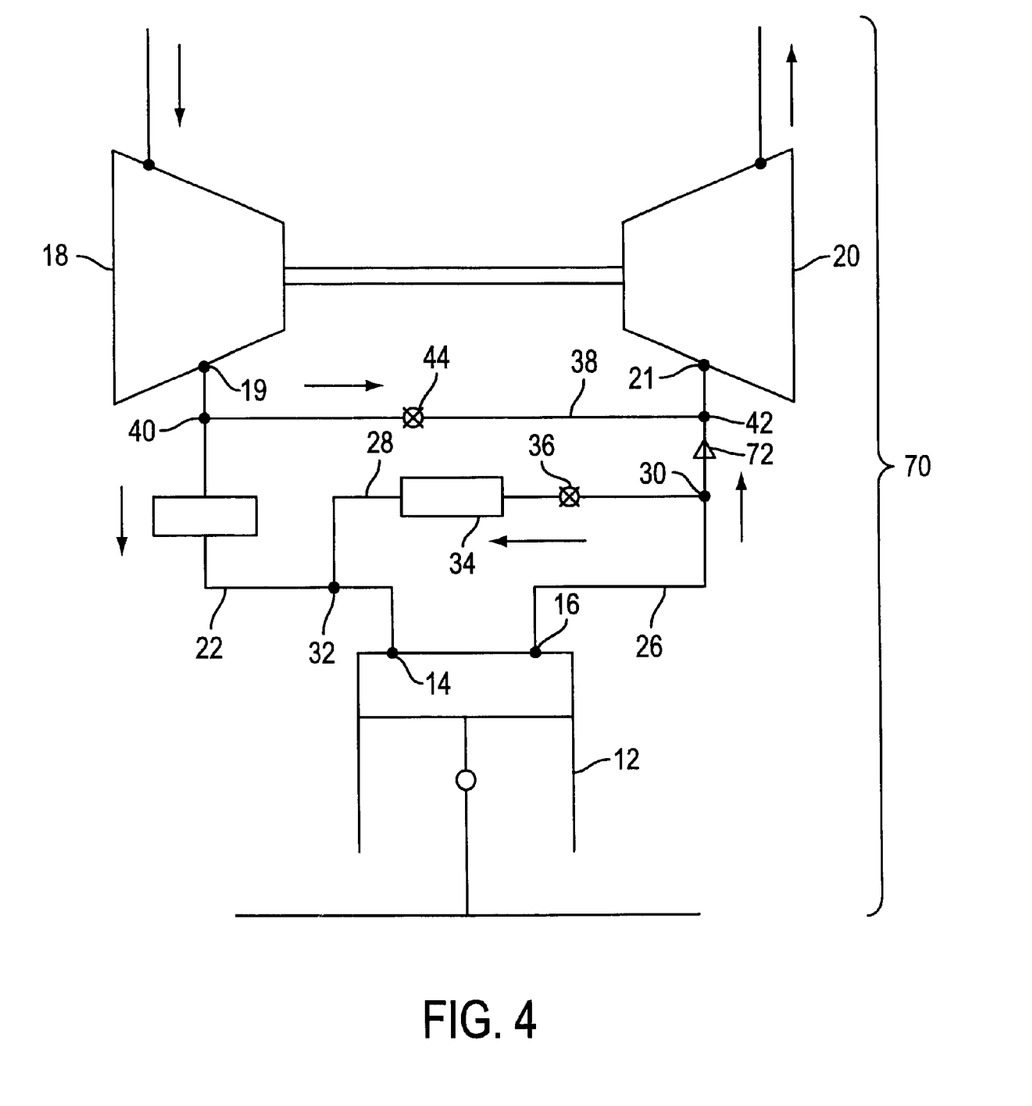
FIG. 4 is a schematic diagram showing a fourth embodiment of a turbocharged engine assembly with exhaust gas recirculation according to the present invention.

A fourth embodiment of a turbocharged internal combustion engine assembly with EGR according to the present invention is shown in FIG. 4 at 70. Like the previous embodiments, the engine assembly in this fourth embodiment includes an engine 12 with one or more cylinders, and a turbocharger having an air compressor 18 driven by an exhaust turbine 20. Like the embodiment of FIG. 1, the engine assembly also includes an air inlet line 22 with a main cooler 24 that leads from the compressor outlet 19 to the engine inlet 14, an exhaust line 26 that leads from the engine outlet 16 to the exhaust turbine inlet 21, and an EGR return line 28 with a cooler 34 branching off from a first point 30 along the exhaust line and connecting with the air inlet line at a point 32 upstream of the engine. The engine assembly also includes a combustion bypass line 38 with a valve 44 extending from a third point 40 along the air intake line 22 to a fourth point 42 along the exhaust line. Unlike the embodiment of FIG. 1, however, the engine assembly in this fourth embodiment does not include a venturi and is provided with an orifice 72 in the exhaust line 26. The orifice 72 is located at a point along the exhaust line 26 between the first and fourth points 30 and 42 corresponding to the upstream end of the EGR return: line and the downstream end of the combustion bypass line, respectively.

By placing an orifice 72 in the exhaust line 26, the pressure in the line upstream of the orifice is increased while the pressure in the line downstream of the orifice is decreased. The increase in pressure upstream of the orifice 72 creates a pressure differential across the EGR line 28 causing exhaust gases to flow through the EGR line when the EGR valve 36 is open. Then, to increase air flow through the compressor 18, turbine inlet geometry is chosen so that the pressure in the exhaust line 26 downstream of the orifice 72 is lower than the pressure at the compressor outlet 19, thereby allowing compressed air to flow through the combustion bypass line 38 to the exhaust turbine 20 when the combustion bypass valve 44 is open.

Figure 5:
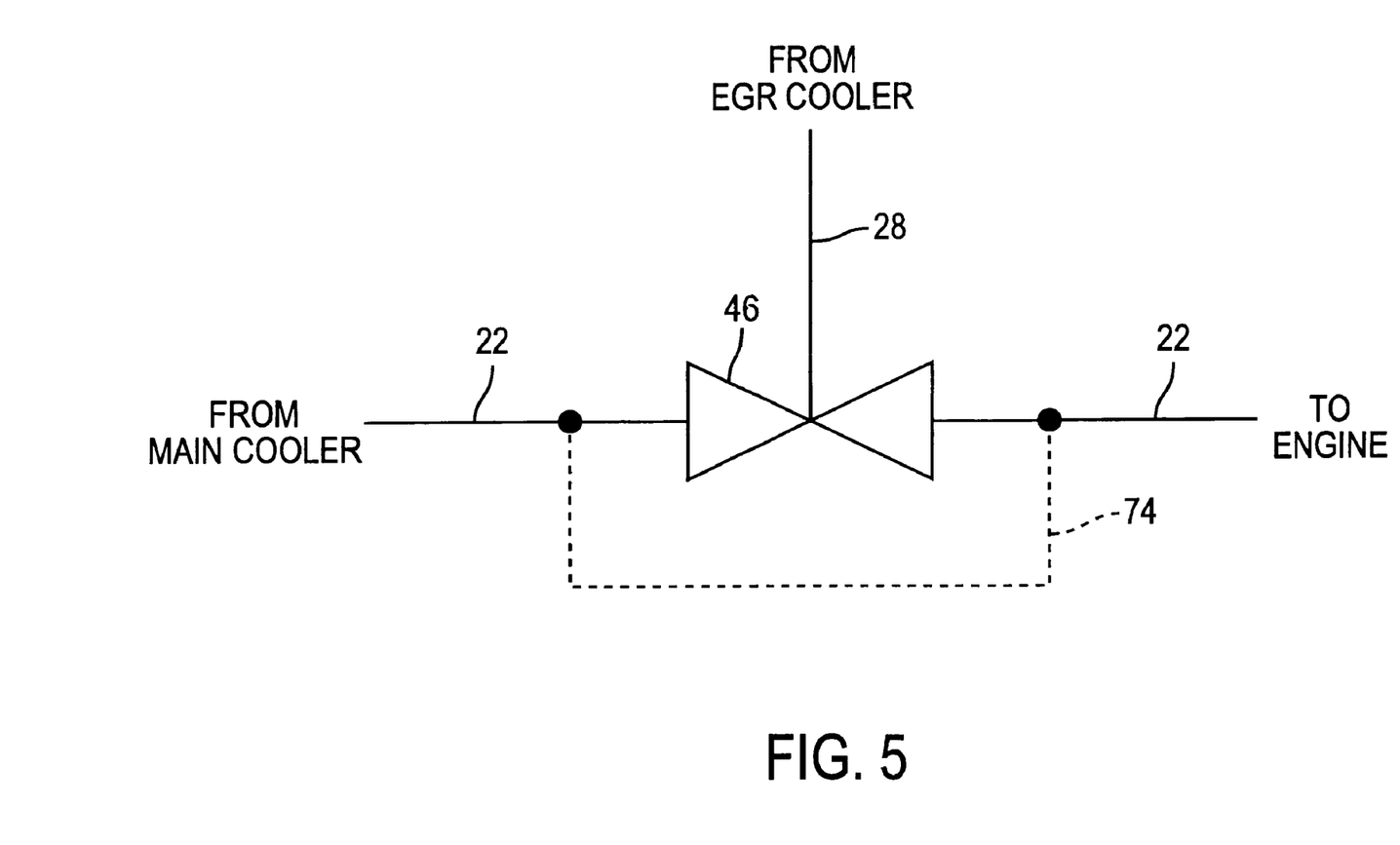
FIG. 5 is a fragmentary schematic diagram showing a venturi bypass line that may be used in a turbocharged engine assembly with exhaust gas recirculation according to the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts. For example, when a venturi 46 is provided in the air intake line 22 to counteract the effect of the bypass line on the flow of exhaust gases through the EGR line 28, a valved bypass line 74 can extend around the venturi as shown by broken lines in FIG. 5 to allow compressed air to flow into the engine without passing through the venturi if the pressure is already low enough after the main cooler to induce flow through the EGR line. In another variation, one or more additional combustion bypass lines can be provided between the inlet air line and the exhaust line. For example, respective bypass lines can terminate upstream and downstream of the turbine.

It will be appreciated that the present invention can be implemented in turbocharged diesel engines as shown or in any other type of turbocharged internal combustion engine. The engine can have any number of cylinders.

As mentioned above, any conventional turbocharger and EGR components can be used. The turbocharger can be a single stage turbocharger, a compound turbocharger, a series turbocharger, or any other type of turbocharger. The exhaust turbine can have a fixed inlet nozzle geometry or a variable inlet nozzle geometry. Examples of suitable coolers for use in the air intake and/or EGR lines include, without limitation, shell and tube type coolers and fin and plate type coolers. Some examples of suitable valves for use in the EGR and/or bypass lines include modulated poppet-type valves, proportional solenoid valves and butterfly-type valves.

Features of the various embodiments can be combined in any manner. For example, any of the embodiments can be modified to include a venturi, a power turbine, a split exhaust manifold and/or an orifice as described above.

What is claimed is:

1. A turbocharged internal combustion engine assembly with exhaust gas recirculation comprising
   an internal combustion engine having an air intake and an exhaust gas outlet;
   an exhaust gas turbine having a turbine inlet and a turbine outlet;
   an air compressor driven by said exhaust gas turbine;
   an air intake line extending from said compressor to said engine intake;
   an exhaust line extending from said exhaust gas outlet to said turbine inlet;
   an exhaust gas recirculation line extending from a first point on said exhaust line downstream of said engine to a second point on said air intake line upstream of said engine;
   a combustion bypass line extending directly from a third point on said air intake line upstream of said exhaust gas recirculation line to a fourth point on said exhaust line downstream of said exhaust gas recirculation line; and
   a pressure adjusting feature disposed along at least one of said air intake line and said exhaust gas line to maintain the pressure at said fourth point below the pressure at said third point and above the pressure at said second point.

2. The engine assembly of claim 1, wherein said pressure adjusting feature is an orifice disposed along said exhaust gas line downstream of said first point and upstream, of said third point.

3. The engine assembly of claim 1, wherein said exhaust turbine includes a plurality of inlets having different cross-sectional areas and said pressure adjusting feature includes said turbine inlets, wherein said exhaust manifold includes a first manifold portion communicating with a first set of engine cylinders and a second manifold portion communication with a second set of engine cylinders, gas line extends from a first set of cylinders to a first of said turbine inlets, and further comprising a second exhaust gas line extending from a second set of cylinders to a second of said turbine inlets.

4. The engine assembly of claim 3, wherein said return line extends from a fifth point on said first exhaust gas line to a sixth point along said charging air line, and further comprising a second return line extending from a seventh point on said second exhaust gas line to an eight point on said return line.

5. The engine assembly of claim 1, wherein said pressure adjusting feature includes a power turbine disposed along a portion of said exhaust gas line downstream of said exhaust gas turbine.

6. The engine assembly of claim 1 wherein said fourth point is disposed along said portion of said exhaust gas line downstream of said exhaust gas turbine.

7. The engine assembly of claim 5, further comprising a drive shaft coupled with said cylinder, wherein said power turbine is coupled with said drive shaft.

8. The engine assembly of claim 1, wherein said pressure adjusting feature is a venturi disposed at said second point.

9. The engine assembly of claim 8, further comprising a cooler disposed along said exhaust gas recirculation line.

10. The engine assembly of claim 9, further comprising a cooler along said air intake line.

11. The engine assembly of claim 9, further comprising a valve disposed along said exhaust gas recirculation line.

12. The engine assembly of claim 11, further comprising a valve disposed along said combustion bypass line.

13. A method of operating a turbocharged internal combustion engine with exhaust gas recirculation comprising the steps of
   feeding exhaust gas from the engine to an exhaust turbine via an exhaust line;
   compressing air with an air compressor powered by the exhaust turbine;
   feeding compressed air from the air compressor to the engine via an air intake line;
   providing an exhaust gas recirculation line between a first point on the exhaust line downstream of the engine and a second point on the air intake line upstream of the engine;
   providing a combustion bypass line between a third point on the air intake line upstream of the second point and a fourth point on the exhaust line downstream of the first point; and adjusting the pressure in at least one of the intake air line and the exhaust line such that the pressure at the fourth point is below the pressure at the third point and above the pressure at the second point so that a first portion of the exhaust gas from the engine is mixed with a first portion of the compressed air from the compressor for combustion in the engine and a second portion of the compressed air is diverted from the air intake line to the exhaust line without subsequent combustion.

14. The method of claim 13, wherein said pressure adjusting step includes the step of passing the first compressed air portion through a venturi, wherein the second exhaust gas portion is mixed with the first compressed air portion in the venturi.

15. The method of claim 13, wherein said pressure adjusting step includes the step of driving a power turbine with exhaust gases from the exhaust turbine via an extension of the exhaust line and connecting the combustion bypass lie with the exhaust line extension.

16. The method of claim 13, wherein said pressure adjusting step includes the step of passing exhaust gases from the engine through an orifice in the exhaust line such that the pressure downstream of the orifice is lower than the pressure upstream of the orifice.

17. The method of claim 13, wherein said pressure adjusting step includes the steps of feeding exhaust gases from a first set of cylinders to a first turbine inlet and feeding exhaust gases from a second set of cylinders to a second turbine inlet.

18. The method of claim 17, wherein the second turbine inlet is smaller than the first turbine inlet, and wherein the first compressed air portion is mixed with exhaust gases from the first set of cylinders.

* * * * *